United States Patent [19]
Carpentier et al.

[11] Patent Number: 5,515,088
[45] Date of Patent: May 7, 1996

[54] METHOD AND DEVICE FOR CONTROLLING THE PAPER FEED IN A PROCESSOR-DRIVEN PRINTER

[75] Inventors: Gilles Carpentier, Germain en Laye; Thierry Oddo, Guyan-Court, both of France

[73] Assignee: Sextant Avionique, Meudon la Foret, France

[21] Appl. No.: 174,706

[22] Filed: Dec. 29, 1993

[30] Foreign Application Priority Data

Jan. 12, 1993 [FR] France .................. 93 00378

[51] Int. Cl.⁶ .................. B41J 11/42; B41J 11/46
[52] U.S. Cl. .................. 346/100; 400/580
[58] Field of Search .................. 347/218; 346/134, 346/136; 400/580

[56] References Cited

U.S. PATENT DOCUMENTS 3,658,163  4/1972  Sniderman .
4,227,644  10/1980  Sakano .................. 400/580
5,061,947  10/1991  Morrison et al. .

FOREIGN PATENT DOCUMENTS

| 56-106887 | 8/1981  | Japan .................. 400/580 |
| 57-043887 | 3/1982  | Japan .................. 400/580 |
| 58-168590 | 10/1983 | Japan .................. 400/580 |
| 0020685   | 2/1984  | Japan . |
| 0001563   | 1/1988  | Japan . |
| 8907529   | 8/1989  | WIPO . |

*Primary Examiner*—Huan H. Tran
*Attorney, Agent, or Firm*—Browdy and Neimark

[57] ABSTRACT

The device embodying the invention is intended to equip a processor-driven printer comprising a hopper capable of containing and supporting a freely rotating roll of paper, a guide and drive means enabling the web of paper to be led from the roll to a drive device, to a line by line print station and then to an output orifice. It comprises at least one first detector capable of detecting marks affix on the web, in an area not used for printing. The invention applies to a printer of the type used in man/machine dialog or in remote transmission.

13 Claims, 5 Drawing Sheets

METHOD AND DEVICE FOR CONTROLLING THE PAPER FEED IN A PROCESSOR-DRIVEN PRINTER

BACKGROUND OF THE INVENTION

1. Field of the Invention

This invention relates to a method and device for controlling the paper feed in a processor-driven printer.

In a general way, it applies to the printers used in man/machine dialog and to printers used for remote transcription purposes, such as printers used in Modem transmission systems or equipping telefax type devices.

It is more particularly, though not exclusively, suited to printers used in pilot/on-board computer dialog in aircraft, which are specially designed so as to be able to be manipulated in difficult conditions by a pilot sitting at the controls of his aircraft (and whose two hands are rarely available at once).

2. Description of the Prior Art

Printers of this type are known to usually comprise:

a hopper capable of containing and supporting a roll of paper while enabling it to rotate freely about an axis, a paper extraction means acting on the roll, in a region of the latter, opposite the hopper access orifice, and a guide and drive means enabling the web of paper extracted by the extraction means to be led, in succession, to a drive device, to a print station and then to an output slot possibly fitted with a paper cutting means.

The paper feed could, of course, be synchronized with the printing tasks performed by the print head.

Usually, during the printing phase, the web of paper advances step by step, each step corresponding to a line or element of a writing line. This result is obtained by the fact that the processor which drives the print head controls the motor driving the paper feed.

Experience has shown that when the web of paper is not perforated laterally (tear strip) or when the feed is not driven by toothed wheels but by simple friction, by means of rollers, there can be occurrences of abnormal operation leading to variations in the feed speed of the paper along its path in the guide means.

This can cause printing defects such as line parallelism faults, line space variations, superimposing of lines, or even jamming phenomena putting the printer out of action.

OBJECT OF THE INVENTION

The main object of this invention is to remedy the preceding drawbacks.

SUMMARY OF THE INVENTION

Accordingly, there is provided a method and device enabling dynamic information on the paper feed in the printer to be provided in order to monitor the smooth running of operations, to report printing faults, and to enable printing to be automatically stopped in the event of paper jamming problems, and this without having to modify either the detectors, printing system or type of paper used.

The invention achieves this result by way of a method comprising a succession of cycles each comprising:

affixation of a mark on the web by means of a marking device situated at a first location on the path of the web, inside the printer, detection of the presence or absence of the mark at least at a second location on the path, real-time measurement of a parameter representative of the position of the mark throughout its path from the first location to the second location, comparison of the measured position with reference values defining a theoretical position of the second location, and at the instant when the measured position corresponds with the theoretical position, verification of the presence of the mark and, failing this, emission of a fault signal.

Advantageously, the marking will be performed in a lateral margin of the web not used for printing.

Moreover, this marking can be performed by the print head of the printer or by an ancillary printing means situated upstream of the print head in relation to the web feed direction.

The method embodying the invention can further comprise the detection of the presence or absence of paper on a part of the path situated upstream of the print head or the above-mentioned printing means.

In certain cases, the detection of the marks can be performed at several successive locations on the path for the purposes of more accurate locating of a variation in web speed.

Detection of the marks can be performed by means of two-level threshold detection devices capable of detecting three separate statuses, i.e. presence of unmarked paper, presence of marked paper, and absence of paper.

BRIEF DESCRIPTION OF THE DRAWINGS

Further features and advantages of the invention will be apparent from the embodiments of the invention described, by way of non-limiting examples, in reference to the corresponding accompanying drawings in which.

DESCRIPTION OF THE PREFERRED EMBODIMENTS

Figure 1:
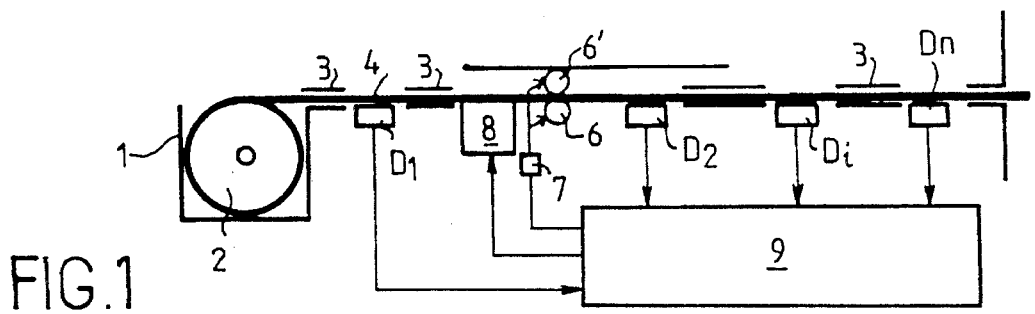
FIG. 1 is a schematic representation of a printer equipped for implementation of the method embodying the invention.

As represented schematically in FIG. 1, the printer successively comprises, conventionally:

a hopper 1 to contain a freely rotating roll of paper 2, a guide means 3 enabling a path (rectilinear in this instance) to be defined for the web of paper 4, a means for driving the web of paper along its path, this means consisting, in this instance, in two drive rollers 6, 6' of which one is coupled to a stepping motor 7, a printing device 8 that can consist in a thermal print bar rigidly mounted inside the printer, and a processor 9 commanding the printing device and drive motor.

To illustrate the general operating principle of the device embodying the invention, the theoretical positions of n detectors have been indicated along the path of the web, i.e. notably a detector $D_1$, a detector $D_2$, a detector $D_i$ and a detector $D_n$ whose information is transmitted to the processor 9.

Figure 2:
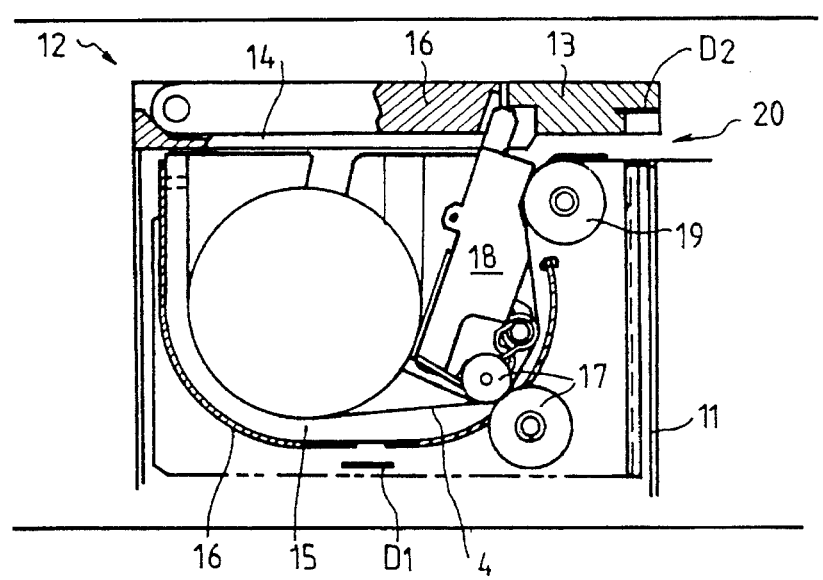
FIG. 2 is a schematic cutaway view showing an embodiment of a printer designed to be taken on board an aircraft.

The printer could, of course, merely comprise two detectors $D_1$, $D_2$, as in the example represented in FIG. 2 which shows a structure of a printer susceptible of being taken on board an aircraft.

This printer is housed inside a parallelepiped-shaped box 11 designed to be flush-mounted in a slot provided for this purpose in a panel of the cockpit of the aircraft, so that only the front side 12 of the printer can be seen and accessed by the pilot.

This front side 12 comprises, on one side, a control panel 13 for the printer on which are mounted the various control elements and viewing elements and, on the other side, an orifice 14 providing access to a paper hopper 15.

This orifice 14 can be sealed by a lid 16 articulated on the box 11.

The bottom of the hopper 15 is shaped to form a deflector 16 serving to guide the web 4 towards a drive device for the paper associated with a printing device.

The drive device is, in this instance, constituted by a conventional type capstan 17 driven by a stepping type geared motor. As for the printing device, it uses a thermal type static print bar.

At the output of the printing device 18, the paper web 4 is routed (by means of an extension of the deflector 16) towards a return roller 19 also driven by the stepping motor, before leaving the printer via a slot 20 in the box, in a region adjacent the control panel 13.

In this example, the printer only comprises two detectors, i.e.

a detector $D_1$ disposed upstream of the capstan, a detector $D_2$ disposed at the level of the output slot.

These detectors $D_1$, $D_2$ play an identical role to that of the detectors $D_1$, $D_2$ used in the example in FIG. 1. It is for this reason that they have been designated in the same way.

Figure 3:
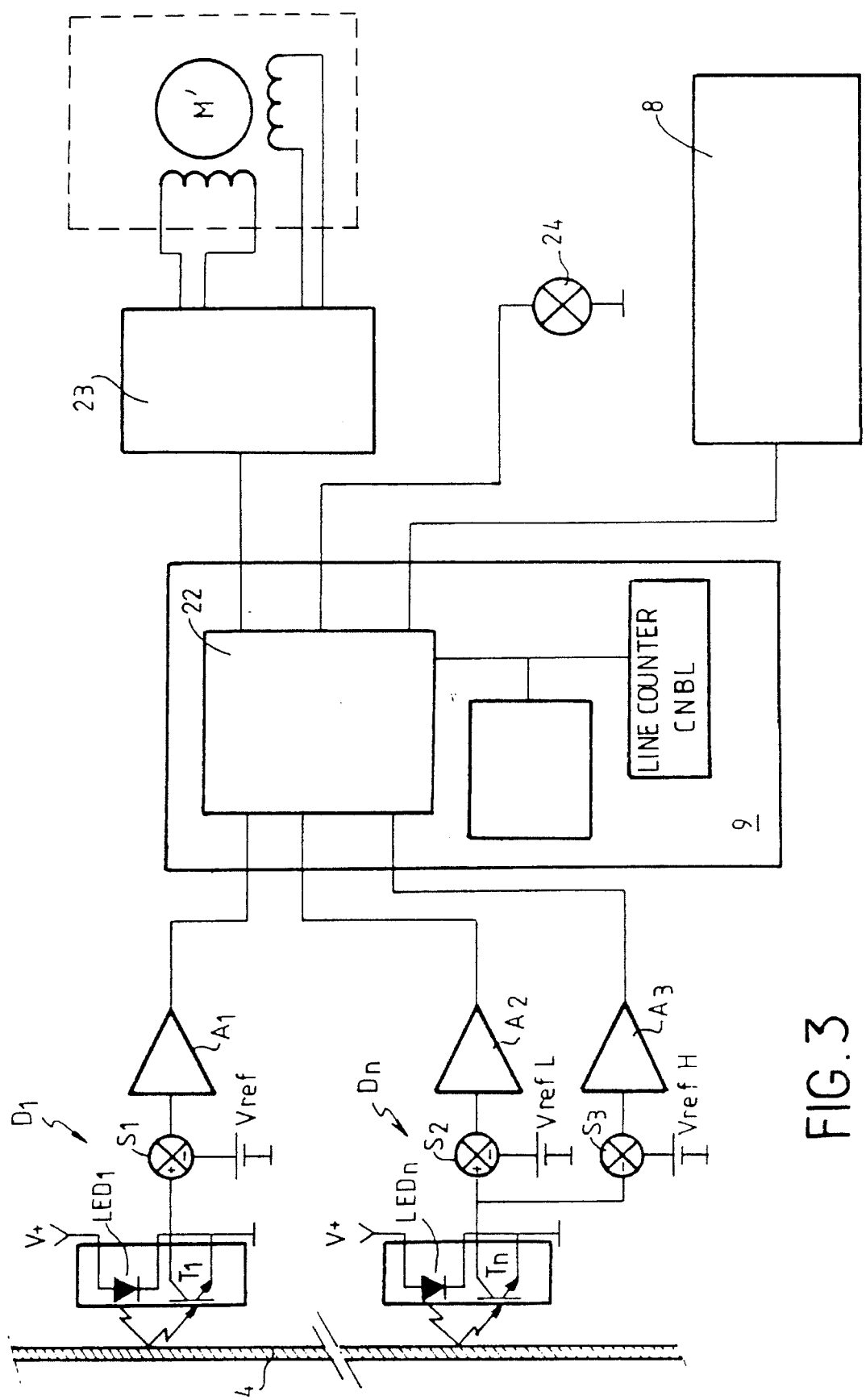
FIG. 3 is a theoretical diagram of the electronic circuit of the printer.

Each of the detectors $D_1$, $D_2$ ... $D_i$ ... $D_n$ can use, as represented in FIG. 3, a radiation source such as a light-emitting diode $LED_1$, $LED_n$ which emits an incident luminous radiation, possibly infrared, over an area passed by the web 4, and a receiver such as, e.g. a photistor $T_1$, $T_n$ disposed so as to be able receive a radiation reflected by the web, and coming from the source.

In this example, the detection signal transmitted by the photistor $T_1$ of the detector $D_1$ is applied to the input of a comparator $S_1$ of which the second input receives a reference voltage Vref. The output of this comparator is applied to the input of a Schmitt-trigger $A_1$ whose output flips from the "0" status to the "1" status when the level of the detection signal reaches and exceeds the reference voltage value Vref. The logic signal generated by the trigger $A_1$ is applied to an input of a microsequencer 22 which is part of a processor comprising an arithmetic and logical unit ALU and a line counter CNBL.

The detection signal supplied by the photistor of each detector $D_2$ ... $D_n$ is applied:

to the input of a comparator $S_2$ whose second input receives a reference voltage Vref L, and to the input of a comparator $S_3$ whose second input receives a voltage Vref H.

The outputs of the comparators $S_2$ and $S_3$ are connected to the microsequencer 22 via two triggers $A_2$, $A_3$ of the same type as trigger $A_1$.

The microsequencer 22 handles the commanding the feeding of the paper feed motor M', via a paper feed sequencer 23, and of the printing device 8. It is also designed to emit an alarm signal, e.g. for an alarm device 24, upon detection of a problem affecting the paper feed.

The reference voltage Vref applied to the input of the comparator $S_1$ is determined such that the trigger $A_1$ emits a signal representative of the presence or absence of paper opposite the detector. In the remainder of the description, the output signal of the trigger $A_1$ will be referred to as threshold $C_1$, logic-zero corresponding To the absence of paper in front of the detector and logic-one corresponding to the presence of paper in front of the detector $D_1$.

The reference voltages Vref L and Vref H applied to the two comparators $S_2$, $S_3$ associated with the detectors $D_2$ ... $D_n$ are determined so as to enable three separate statuses to be detected, i.e. presence of unprinted paper, presence of printed paper, absence of paper.

The output signals of the triggers $A_2$, $A_3$ will be referred to hereinafter as threshold $C_2$ L and threshold $C_2$ H.

The voltage Vref L is more particularly determined so that the logic-zero status of the output signal of the trigger $A_2$ corresponds to the absence of paper in front of the detector, and so that the logic-one status corresponds to the presence of paper, printed or otherwise, in front of the detectors $D_2$ ... $D_n$.

The voltage Vref H is determined so that the logic-zero status of the output signal of the trigger $A_3$ corresponds to the presence of printed paper in front of the detector, and so that the logic-one status corresponds to the presence of unprinted paper in front of the detectors $D_2$ ... $D_n$.

The combinations of the different statuses of the two detectors $D_1$, ($D_2$ ... $D_n$) are summarized in the following table:

| | DETECTOR (1, ... n) | | |
| --- | --- | --- | --- |
| THRESHOLD $C_2$H | THRESHOLD $C_2$L | DETECTOR THRESHOLD $C_1$ | PAPER STATUS |
| (1) 0 | 0 | 0 | No paper |
| (2) 0 | 0 | 1 | Paper being loaded |
| (3) 0 | 1 | 0 | End of paper |
| (4) 0 | 1 | 1 | Printed paper in place |
| (5) 1 | 0 | 0 | Failure or error |
| (6) 1 | 0 | 1 | Failure or error |
| (7) 1 | 1 | 0 | End of paper |
| (8) 1 | 1 | 1 | Unprinted paper in place |

In the eight different statuses in the table above, only the two statuses "printed paper in place" (4) and "unprinted paper in place" (8) authorize a printing process to start.

When one of these two configurations (4) and (8) of the system is detected and a print request is activated, the system then switches to the mode for dynamic monitoring of the paper feed inside the printer.

This mode for dynamic monitoring of the paper feed includes the printing, on the paper web preferably outside the useful area reserved for data to be printed, of markers or marks that can be read by the detectors $D_1$, $D_n$.

Figure 4:
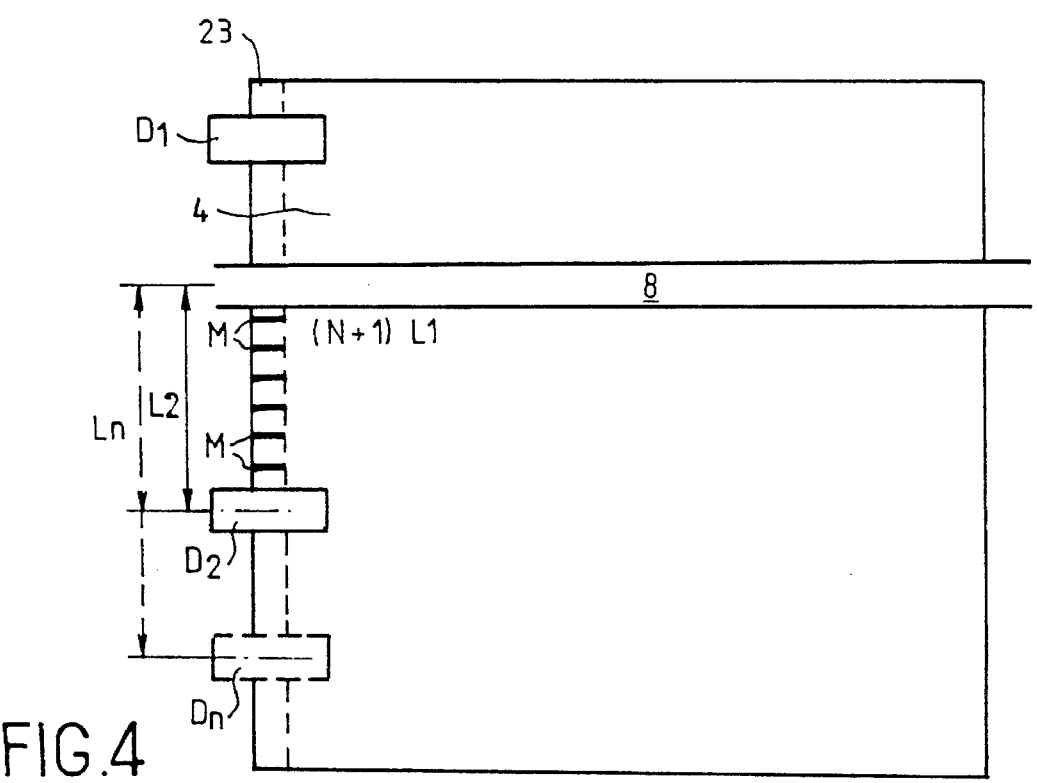
FIG. 4 is a schematic representation showing the web of paper along its path in the printer.

This printing is illustrated in FIG. 4 in which the paper web is seen with the detectors $D_1$, $D_2$ and printing device 8 both superimposed.

In this example, the marks (M) are printed by the printing device 8 in a left margin 23 of the web 4 that is usually unutilized.

The detector $D_2$ is situated at a distance $L_2$ from the printing device, this distance being referred to hereinafter as $NBL_2$.

By way of these dispositions, each mark or marker is formed by a succession of dashes comprising $NBL_1$ lines printed alternately with blanks, over a length $L_1$ designed so that the scope of detection of the detector is contained within the marker.

From the optical point of view, these marks form a grey area distinguishable from the white of the paper or from black (absence of paper).

As with the distance $L_1$, the distance $L_2$ is translated into a number of lines $NBL_2$ as a function of the resolution of the printing device (number of points per unit of length), these lines being counted by a line counter CNBL indicated in FIG. 3.

The parameter k used hereinafter corresponds to the number of marks already printed.

The gap (not printed) between two successive marks is equal to a multiple of $NBL_1$, i.e. $n \times NBL_1$ (n>1).

It should be specified that in the general case where N detectors are used along the circuit to be monitored, the distance between the print head and the detector $D_n$ will be referred to as $L_n$ and will also be translated into a number of lines.

In this case, the distances separating the detectors $D_2 \ldots D_n$ must be integral multiples of the distance $(n+1) L_1$.

Figure 5:
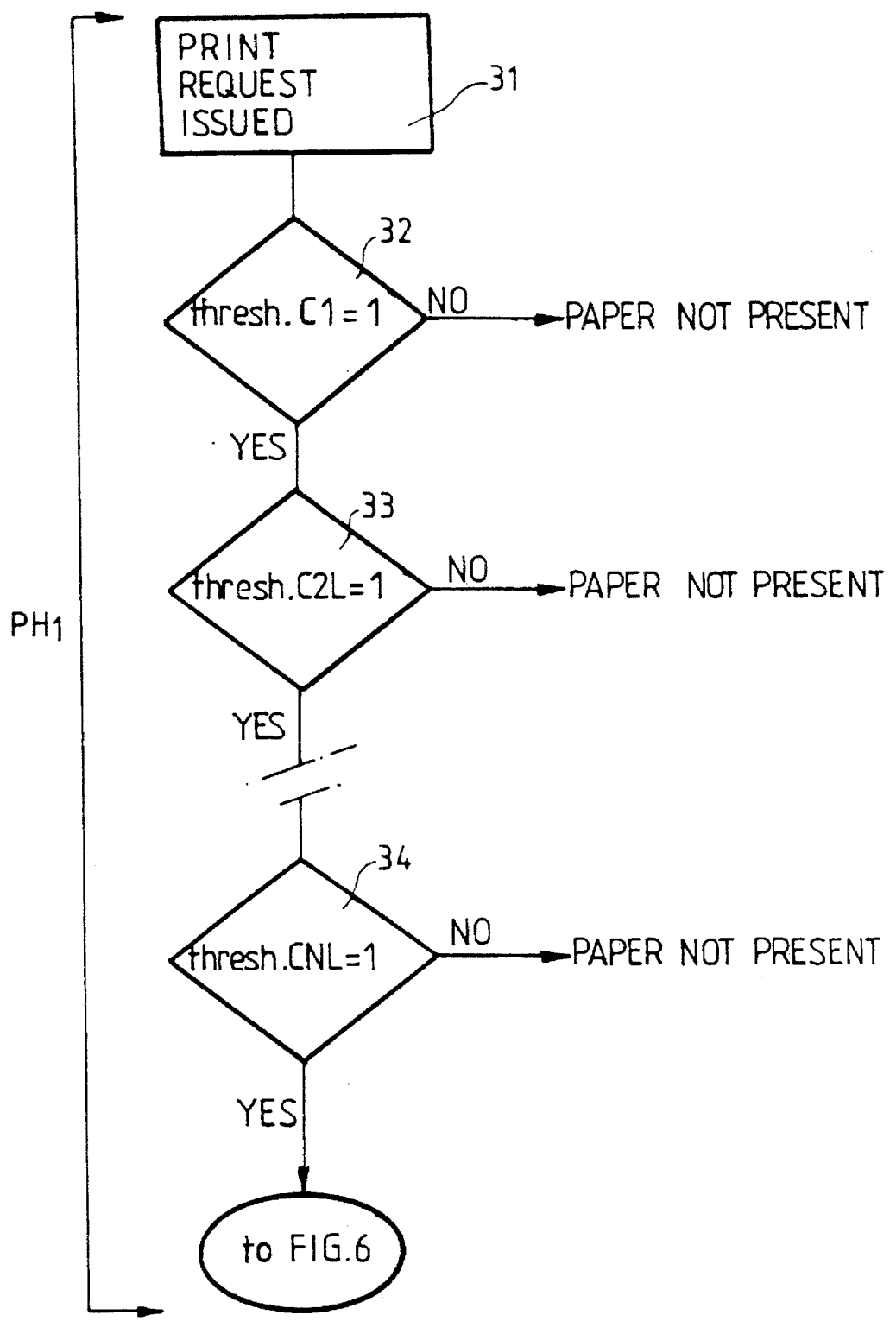
FIGS. 5, 6 and 7 represent a flow chart illustrating the operating principle of a device embodying the invention.
Figure 6:
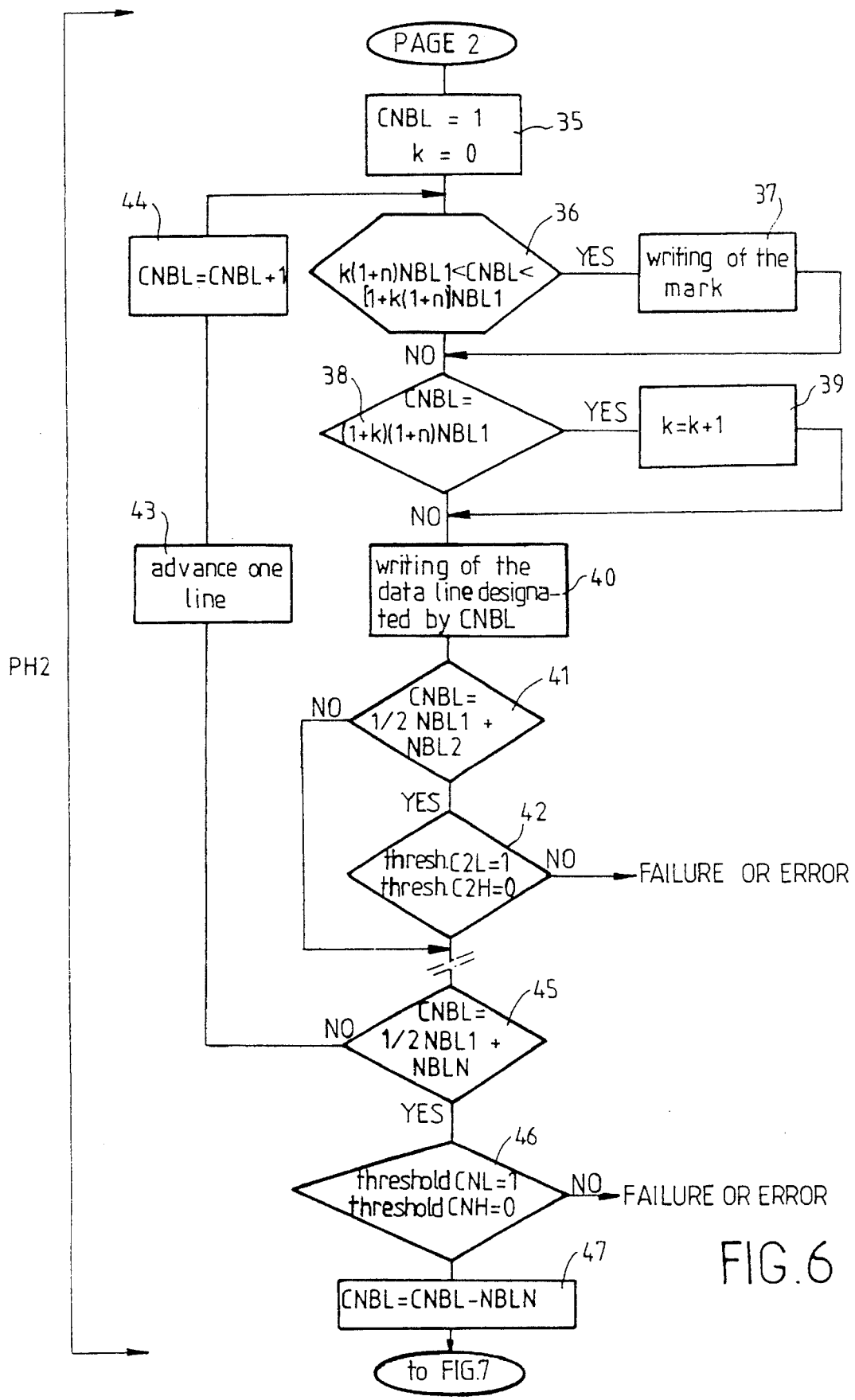
Figure 7:
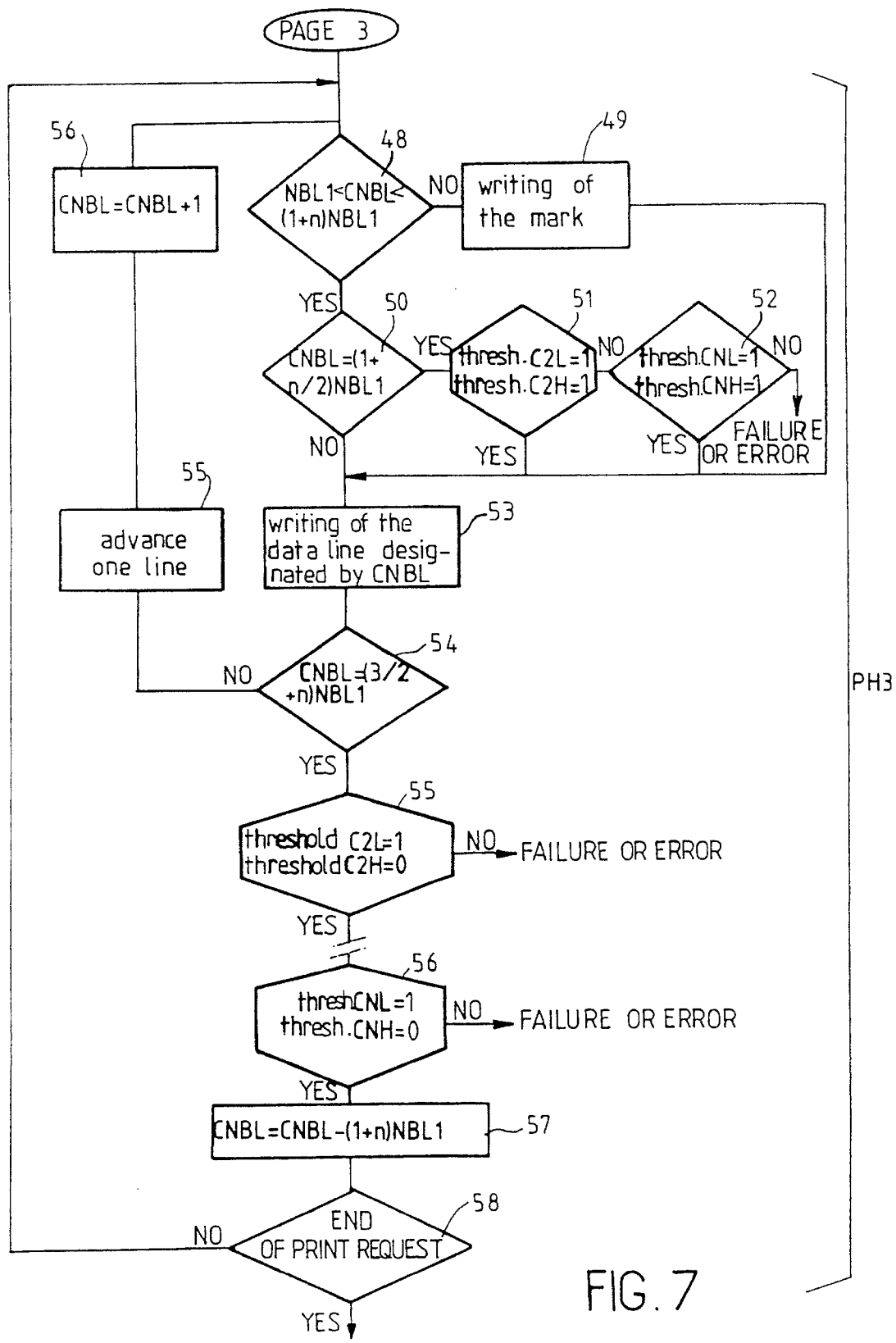

The operating of the device described hereinabove (general case of N detectors) will be described in detail hereinunder in reference to the organisation chart illustrated in FIGS. 5 to 7.

As previously mentioned, once a print request has been received (block 31), the system proceeds with a phase $PH_1$ to check the static presence of paper prior to the start of the printing phase.

This checking phase comprises a detection of the presence of paper by the detector $D_1$ (block 32), followed by, if the signal "threshold $C_1$" is in the "1" status, a detection of the presence of paper by the detector $D_2$ (block 33), and followed by the other detectors up to the detector $D_n$ (block 34).

When the signals "threshold $C_1$", "threshold $C_2L$" and $C_NL$ are all at "1", the system initializes the parameters of computation and, in particular, of the line counter (CNBL= 1) and zeroizes the parameter k (block 35).

Once this computation parameter initializing phase has been completed, the system moves on to a phase $PH_2$ initializing the writing of the marks corresponding to the start of the printing process.

This initializing phase comprises a comparison phase in order to determine whether the number of lines counted by the counter CNBL is within the window included between the values $k (1+n) NBL_1$ and $[1+k (1+n)] NBL_1$ (block 36), i.e. if this number of lines corresponds to an area in which a mark must be printed.

If so, the system proceeds to write one line of the marker (block 37) before moving on to the next stage. If not, the system moves directly to the next stage.

This new stage comprises a loop managing the index of the number of marks printed, as long as the first marker is not in front of the detector $D_2$.

This loop consists in comparing (block 38) the content of the line counter with a value $(1+k) (1+n) NBL_1$. When this comparison reveals an identity, the system increments the parameter k by one (block 39) before commanding the writing of the data line designated by the line counter CNBL (block 40). Otherwise, the system issues this write command directly.

In the next stage (block 41), the system checks that the first marker has arrived in front of the second detector $D_2$. This situation is ascertained when the following equality is obtained:

$CNBL = \frac{1}{2} NBL_1 + NBL_2$ indicating that the index is centered on the detector $D_2$.

If the equality is ascertained, the system checks that the printed marker has indeed arrived in front of the detector $D_2$ and that the signal emitted by the detector $D_2$ is correct. This check is conducted while ensuring that the signals THRESHOLD $C_2L$ and THRESHOLD $C_2H$ are respectively at "1" and "0" (block 42).

If these two relations do not prove to be true, the system emits a failure or error signal.

However, if both relations do prove true, the system repeats the process of blocks 41 and 42 for each of the detectors up to the detector N. Similarly, the system checks the following equality for this detector:

$CNBL = \frac{1}{2} NBL_1 + NBL_N$ (block 45)

If this equality does not prove to be true, the system advances one line (block 43) by way of a return upstream of block 36, after having incremented the line counter by one unit (block 44).

If the equality does prove true, the system ensures that the signals THRESHOLD $C_NL$ and THRESHOLD $C_NH$ are respectively at "1" and "0" (block 46). If this is not the case, the system emits a failure or error signal.

However, when this is the case, the system proceeds to re-initialize the counter so as to compute the distance between the detector $D_n$ and the printing device (block 47).

This initialization is obtained by subtracting the value $NBL_N$ from the counter content, the counter output value then being $CNBL = \frac{1}{2} NBL_1$.

The system then begins a phase $PH_3$ of normal line monitoring modulo $(n+1) NBL_1$.

In this loop, the system firstly determines whether the content of the counter comes within the window delimited by the values $NBL_1$ and $(1+n) NBL_1$ (block 48), i.e. whether it corresponds to an area situated between two markers. If this is not the case, the system commands the writing of a marker line (block 49). It then moves on to write the data line designated by the counter.

If the counter content is not within the above-mentioned window, the system ensures (block 50) that, at the mid-point between two markers ($CNBL = (1+n/2) NBL_1$), there is indeed a blank (absence of printing on the paper web), which is translated (blocks 51, 52) by the following logical equations:

THRESHOLD $C_2L = 1$
THRESHOLD $C_2H = 1$
$\overline{\text{THRESHOLD } C_NL = 1}$
THRESHOLD $C_NH = 1$ If these relations do not prove to be true, the system emits a failure or error signal. Otherwise, it proceeds to write the data line designated by the counter (block 53).

The system then determines the instant at which the content of the counter marks the end of printing of the marker ($CNBL = (\frac{3}{2}+n) NBL_1$) (block 54).

As long as this instant has not been exceeded, the system proceeds to advance by one line (block 55), causing the counter to be incremented (block 56) and returning to the start of block 48 to write a new marker line.

When the content of the counter reaches the value (½+n) $NBL_1$, the system checks that the detector $D_2$ detects printed paper, by means of the double relation:

THRESHOLD $C_2L=1$

THRESHOLD $C_2H=0$

If this double relation does not prove to be true, the system emits a failure or error signal.

Conversely, if this double relation does prove true, the system proceeds identically for the other detectors up to detector N (block 56).

Likewise, if the double relation

THRESHOLD $C_NL=1$

THRESHOLD $C_NH=0$ does not prove to be true, the system emits a failure or error signal. However, if this double relation does prove true, the system re-initializes the counter at its loop input value $CNBL=½ NBL_1$ (block 57).

This re-initializing is performed by means of the relation $CNBL=CNBL-(1+n) NBL_1$.

Failing an end-of-print-request instruction (block 8), the system loops back to the start of the loop, upstream of block 48.

We claim:

1. A method for monitoring the paper feed in a processor-driven printer comprising a hopper capable of containing and supporting a freely rotating roll of a paper web, a guide and drive means enabling said paper web to be led on a path from the roll to a drive device, to a print station and then to an output orifice, said method comprising a succession of cycles each comprising the steps of:

affixing a mark on said paper web by means of a marking device situated at a first location on said path, inside said printer, detecting presence or absence of the mark at least at a second location on said path, measuring in real-time a parameter representative of position of said mark throughout a portion of said path from the first location to the second location, comparing said parameter with reference values defining a theoretical position of said second location, and at the instant when said measured position corresponds with said theoretical position, verifying the presence of said mark, and sending a fault signal if said measured position does not correspond with said theoretical position.

2. The method as claimed in claim 1, wherein said parameter is measured by counting lines of writing and therefore feed steps of said paper web.

3. The method as claimed in claim 1, wherein said marks are affixed periodically on standard paper in one of lateral margins of said paper web not used for printing, each of said cycles further comprising the step of checking that said mark is absent at the instant the position measured is equal to said theoretical position less half a theoretical distance between two successive marks.

4. The method as claimed in claim 1, wherein said marks are affixed by said print station.

5. The method as claimed in claim 1, wherein said marks are affixed by an ancillary printing device independent to said print station and situated on said path, upstream of said print station.

6. The method as claimed in claim 1, wherein each of said cycles further comprises detecting presence or absence of paper on a part of said path situated upstream of printing means used for printing said mark.

7. A method for monitoring the paper feed in a processor-driven printer comprising a hopper capable of containing and supporting a freely rotating roll of a paper web, a guide and drive means enabling said paper web to be led on a path from the roll to a drive device, to a print station and then to an output orifice, said method comprising a succession of cycles each comprising the steps of:

detecting presence or absence of a mark at several successive locations on said path between a first location and a last location, measuring in real-time a parameter representative of position of said mark all along a portion of said path from said first location to said last location, comparing said parameter with reference values defining respective theoretical positions of said successive locations, and at instants when said measured position corresponds with one of said theoretical positions of a location, verifying that said mark is indeed detected at said location, and sending a fault signal if said mark is not detected at said location.

8. The method as claimed in claim 7, wherein each of said cycles further comprises, at each of said locations excepting said first location, detecting with a two-level threshold three distinct statuses: presence of unmarked paper, presence of marked paper, and absence of paper.

9. The method as claimed in claim 7, wherein said several successive locations are separated by distances which are integral multiples of the length of a mark.

10. A device for controlling paper feed in a processor-driven printer, said device comprising:

a hopper capable of containing and supporting a freely rotating roll of a paper web, a guide and drive means enabling said paper web to be led on a path from the roll to a drive device, to a line by line print station and then to an output orifice, a marking device for affixing marks one by one on said paper web, situated at a first location on said path inside said printer, at least one first detector for detecting presence or absence of marks affixed on said paper web at least at a second location on said path in an area not used for printing, means for real-time measuring a parameter representative of position of a mark throughout a portion of said path from the first location to the second location, means for comparing said parameter with reference values defining a theoretical position of said second location, and means for verifying the presence of a mark at an instant when said measured position corresponds with said theoretical position, and means for sending a fault signal if no mark is detected at said instant.

11. The device as claimed in claim 10, wherein said first detector is located downstream of said print station.

12. The device as claimed in claim 10, further comprising an additional detector situated upstream of said print station, said additional detector being designed to detect presence or absence of paper.

13. The device as claimed in claim 10, wherein said first detector is capable of detecting three statuses:

presence of unmarked paper, presence of marked paper, and absence of paper.

* * * * *